US 8,849,539 B2

(12) United States Patent
Johansson et al.

(10) Patent No.: US 8,849,539 B2
(45) Date of Patent: Sep. 30, 2014

(54) METHOD AND MODULE FOR DETERMINING OF VELOCITY REFERENCE VALUES FOR A VEHICLE CONTROL SYSTEM

(75) Inventors: Oskar Johansson, Stockholm (SE); Jörgen Hansson, Hägersten (SE)

(73) Assignee: Scania CV AB (SE)

( * ) Notice: Subject to any disclaimer, the term of this patent is extended or adjusted under 35 U.S.C. 154(b) by 298 days.

(21) Appl. No.: 13/377,196

(22) PCT Filed: May 31, 2010

(86) PCT No.: PCT/SE2010/050594
§ 371 (c)(1),
(2), (4) Date: Dec. 9, 2011

(87) PCT Pub. No.: WO2010/144031
PCT Pub. Date: Dec. 16, 2010

(65) Prior Publication Data
US 2012/0083984 A1      Apr. 5, 2012

(30) Foreign Application Priority Data

Jun. 10, 2009 (SE) .................................... 0950443

(51) Int. Cl.
| B60T 8/32 | (2006.01) |
|---|---|
| G05D 1/00 | (2006.01) |
| G06F 7/00 | (2006.01) |
| G06F 17/00 | (2006.01) |
| B60W 10/06 | (2006.01) |
| B60W 30/14 | (2006.01) |
| B60W 10/10 | (2012.01) |
| B60W 40/06 | (2012.01) |

(52) U.S. Cl.
CPC ............... *B60W 10/06* (2013.01); *Y02T 10/52* (2013.01); *B60W 2720/103* (2013.01); *B60W 30/143* (2013.01); *B60W 10/10* (2013.01); *B60W 2720/10* (2013.01); *B60W 2250/402* (2013.01); *B60W 40/06* (2013.01)
USPC ...................... 701/93; 701/1; 701/94; 701/96

(58) Field of Classification Search
USPC ............. 701/1, 23, 25, 26, 27, 28, 38, 70, 93, 701/98, 400–541
See application file for complete search history.

(56) References Cited

U.S. PATENT DOCUMENTS 4,211,193 A * 7/1980 Cox et al. .................... 123/352
5,343,780 A * 9/1994 McDaniel et al. ............ 477/108
(Continued)

FOREIGN PATENT DOCUMENTS

| JP | 07117524 A | 5/1995 |
|---|---|---|
| SE | 529578 C2 | 9/2007 |

OTHER PUBLICATIONS

International Search Report dated Sep. 10, 2010, issued in corresponding international application No. PCT/SE2010/050594.

*Primary Examiner* — Bhavesh V Amin
(74) *Attorney, Agent, or Firm* — Ostrolenk Faber LLP (57) ABSTRACT

A method for determination of speed set-point values $v_{ref}$ for a vehicle's control systems, includes determining a horizon from position data and map data of an itinerary made up of route segments with length and gradient characteristics for each segment; calculating threshold values for the gradient of segments according to one or more vehicle-specific values, which threshold values serve as boundaries for assigning segments to various categories; comparing the gradient of each segment with the threshold values and placing each segment within the horizon in a category according to the results of the comparisons; calculating speed set-point values $v_{ref}$ for the vehicle's control systems across the horizon according to rules pertaining to the classes in which segments within the horizon are placed; adding an offset $v_{offset}$ to the calculated speed set-point values $v_{ref}$ when the vehicle is in a segment which is in a category indicating a steep upgrade or a steep downgrade; regulating the vehicle according to the speed set-point values $v_{ref}$. A module determines of speed set-point values for a vehicle's control systems.

17 Claims, 5 Drawing Sheets

(56) References Cited

U.S. PATENT DOCUMENTS

| | | | |
|---|---|---|---|
| 5,560,431 A * | 10/1996 | Stratton | 172/2 |
| 5,731,761 A * | 3/1998 | Sychra | 340/689 |
| 5,748,476 A * | 5/1998 | Sekine et al. | 701/93 |
| 5,868,214 A * | 2/1999 | Workman | 180/179 |
| 6,076,036 A * | 6/2000 | Price et al. | 701/93 |
| 6,161,071 A * | 12/2000 | Shuman et al. | 701/48 |
| 6,188,316 B1 * | 2/2001 | Matsuno et al. | 340/441 |
| 6,233,514 B1 * | 5/2001 | Claussen et al. | 701/93 |
| 6,240,356 B1 * | 5/2001 | Lapke | 701/93 |
| 6,349,253 B1 * | 2/2002 | Bellinger | 701/53 |
| 6,374,173 B1 * | 4/2002 | Ehlbeck | 701/93 |
| 6,392,535 B1 * | 5/2002 | Matsuno et al. | 340/441 |
| 6,484,086 B2 * | 11/2002 | Jeon | 701/93 |
| 6,556,913 B2 * | 4/2003 | Morizane et al. | 701/93 |
| 6,591,181 B2 * | 7/2003 | Hellmann et al. | 701/96 |
| 6,839,619 B2 * | 1/2005 | Bellinger | 701/103 |
| 6,879,902 B2 * | 4/2005 | Nada | 701/93 |
| 6,898,507 B2 * | 5/2005 | Aoyama et al. | 701/93 |
| 6,915,201 B1 * | 7/2005 | Ott et al. | 701/93 |
| 7,460,941 B2 * | 12/2008 | Sychra et al. | 701/50 |
| 7,587,267 B2 * | 9/2009 | Mori et al. | 701/93 |
| 8,229,634 B2 * | 7/2012 | Winkel | 701/58 |
| 8,498,795 B2 * | 7/2013 | Eriksson et al. | 701/93 |
| 2003/0204298 A1 * | 10/2003 | Ahmed-Zaid et al. | 701/96 |
| 2004/0068359 A1 * | 4/2004 | Neiss et al. | 701/96 |
| 2005/0004743 A1 * | 1/2005 | Kojima et al. | 701/96 |
| 2005/0038590 A1 * | 2/2005 | Jung | 701/93 |
| 2005/0096183 A1 * | 5/2005 | Watanabe et al. | 477/182 |
| 2005/0143895 A1 * | 6/2005 | Kato | 701/96 |
| 2006/0030992 A1 * | 2/2006 | Iwatsuki et al. | 701/93 |
| 2006/0224295 A1 * | 10/2006 | Tengler et al. | 701/96 |
| 2007/0005218 A1 * | 1/2007 | Ueyama | 701/96 |
| 2007/0078584 A1 * | 4/2007 | Nakamura et al. | 701/93 |
| 2007/0150134 A1 * | 6/2007 | Yamamoto | 701/30 |
| 2007/0168092 A1 * | 7/2007 | Knox et al. | 701/37 |
| 2007/0265759 A1 * | 11/2007 | Salinas et al. | 701/93 |
| 2009/0037069 A1 * | 2/2009 | Inoue et al. | 701/94 |

* cited by examiner

METHOD AND MODULE FOR DETERMINING OF VELOCITY REFERENCE VALUES FOR A VEHICLE CONTROL SYSTEM

CROSS-REFERENCE TO RELATED APPLICATIONS

The present application is a 35 U.S.C. §§371 national phase conversion of PCT/SE2010/050594, filed May 31, 2010, which claims priority of Swedish Application No. 0950443-2, filed Jun. 10, 2009, the contents of which are incorporated by reference herein. The PCT International Application was published in the English language.

FIELD OF THE INVENTION

The present invention relates to a method and a module for determining speed set-point values.

BACKGROUND TO THE INVENTION

Many vehicles today are equipped with a cruise control to make it easier for the driver to drive the vehicle. The desired speed can then be set by the driver, e.g. via a control device in the steering wheel console, and a cruise control system in the vehicle acts thereafter upon a control system so that it accelerates and brakes the vehicle in order to maintain a desired speed. If the vehicle is equipped with an automatic gear change system, the vehicle's gears are changed so that the vehicle can maintain the desired speed.

When a cruise control is used in hilly terrain, the cruise control system will try to maintain a set speed on upgrades. This results inter alia in the vehicle accelerating over the crest of a hill and possibly into a subsequent downgrade, making it necessary to brake to avoid exceeding the set speed, which is a fuel-expensive way of running the vehicle. it possible to save fuel.

By varying the vehicle's speed in hilly terrain it is possible to save fuel as compared with a conventional cruise control. This may be done in various ways, e.g. by calculations of the vehicle's current state (as with Scania Ecocruise®). If an upgrade is calculated, the system then accelerates the vehicle uphill. Towards the end of the climb, the system is programmed to avoid acceleration until the gradient has levelled out at the top, provided that the vehicle's speed does not drop below a certain level. By lowering the speed at the end of an upgrade, the vehicle can regain speed on a subsequent downgrade without using the engine to accelerate. When the vehicle approaches the bottom of a dip, the system endeavors to use kinetic energy to embark on the next upgrade at a higher speed than an ordinary cruise control. The system will easily provide acceleration at the end of the downgrade in order to maintain the vehicle's momentum. In undulating terrain, this means that the vehicle starts the next climb at a higher speed than normal. Avoiding unnecessary acceleration and using the vehicle's kinetic energy makes If the topology ahead is made known by the vehicle having map data and GPS, such a system can be made more robust and can also change the vehicle's speed in anticipation.

A vehicle usually has a number of ECUs (electronic control units) which control various electronic systems in the vehicle. The engine in the vehicle is often controlled by an ECU of its own, called EMC (engine management system). A cruise control's logic may be situated in the EMS but this is sometimes not possible because the EMS has too little memory space and/or an already high processor load. Where the logic is in some other ECU than the EMS, desired speeds have to be sent via a Controller Area Network (CAN) to the regulator in the engine control system which is intended to regulate the vehicle's speed towards the desired speed.

A traditional Proportional/Integral/Derivative (PID) regulator regulates on a given speed reference value. Therefore, when this reference value is modified by the cruise control's logic and sent via a CAN, it is the PID regulator in the engine control system which is intended to regulate the vehicle speed, towards the given reference value. The cruise control predicts the vehicle's speed but there remains the problem of the cruise control logic trying to predict the speed while at the same time the engine control system tries to control the vehicle's speed. The regulator will control according to a gradually increasing error and will then not provide the engine with maximum torque at the beginning of an upgrade which has been incorporated in the speed prediction calculations.

Published patent application US 2005/0096183 refers to a speed regulator for a vehicle on a downgrade. Hills are here configured to have a particular gradient downhill, and when the driver switches on a gradient switch a constant speed for the vehicle is set for as long as the switch is on. A constant speed of the vehicle is thus set when the driver indicates that the vehicle is on a hill.

In U.S. Pat. No. 6,076,036 the cruise control is based on use of speed setting, the vehicle's current speed, acceleration and the change in the gradient of the road as measured by a sensor, to set the fuel flow for lower fuel consumption.

The object of the present invention is to propose improved cruise control of a vehicle when the vehicle's speed is to be predicted while at the same time being regulated, and in particular to avoid unnecessary fuel being injected into the engine because of an unstable control signal to the engine control system.

SUMMARY OF THE INVENTION

The object described above is achieved by a method for determining speed set-point values $v_{ref}$ for a vehicle's control systems. The method comprises:

A) determining a horizon by means of position data and map data of an itinerary made up of route segments with length and gradient characteristics for each segment;
B) calculating threshold values for the gradient of segments according to one or more vehicle-specific values, which threshold values serve as boundaries for assigning segments to various categories;
C) comparing each segment's gradient with the threshold values and placing each segment within the horizon in a category according to the results of the comparisons;
D) calculating speed set-point values $v_{ref}$ for the vehicle's control systems across the horizon according to rules pertaining to the categories in which segments within the horizon are placed;
E) adding an offset $v_{offset}$ to the calculated speed set-point values $v_{ref}$ when the vehicle is in a segment which is in a category indicating a steep upgrade or a steep downgrade;
F) regulating the vehicle according to the speed set-point values $v_{ref}$.

The invention comprises also a module for determining speed set-point values for a vehicle's control systems. The module comprises:

a horizon unit configured to determining a horizon by means of position data and map data of an itinerary made up of route segments with length and gradient characteristics for each segment;

a processor unit configured to calculating threshold values for the gradient of segments according to one or more vehicle-specific values, which threshold values serve as boundaries for assigning segments to various categories; comparing the gradient of each segment with the threshold values and placing each segment within the horizon in a category according to the results of the comparisons; calculating speed set-point values $v_{ref}$ for the vehicle's control systems across the horizon according to rules pertaining to the categories in which segments within the horizon are placed; and configured to adding an offset $v_{offset}$ to the calculated speed set-point values $v_{ref}$ when the vehicle is in a segment which is in a category indicating a steep upgrade or a steep downgrade; thereafter the vehicle is regulated according to the speed set-point values $v_{ref}$.

The invention provides assurance that the regulator is provided with correct speed set-point values to enable it to follow the prediction of the vehicle's speed. It is thus possible to ensure a maximum of available engine torque on steep upgrades and drag torque/zero torque on steep downgrades. This means that the regulating error for the regulator on steep upgrades is large enough at the beginning of the climb for the engine to be able to deliver maximum torque at the beginning of it in order to prevent the vehicle's speed from dropping more than necessary. On steep downgrades low constant speed set-point values are provided to make it possible to avoid injecting fuel into the engine.

The invention also provides a way to improve the performance of a distributed regulating system in which traditional methods of directly acting upon the regulator, e.g. disconnection or more powerful regulator parameters, are not easy to apply. This is because the set-point value generator and the regulator are in different control units.

The invention also affords the advantage of preventing the vehicle's speed from increasing at the crest, in order to reach its reference speed before a following downgrade. This speed increase at the crest is usually an unnecessary cost.

The invention thus achieves consistent regulation of the vehicle's speed, i.e. no lowering of speed followed by raising of speed at a crest.

BRIEF DESCRIPTION OF THE ATTACHED DRAWINGS

The invention is described below with reference to the attached drawings, in which.

DETAILED DESCRIPTION OF PREFERRED EMBODIMENTS OF THE INVENTION

Information about a vehicle's itinerary can be used to regulate its speed in anticipation in order to save fuel, increase safety and enhance comfort. Topography greatly affects the control of, in particular, the driveline of heavy vehicles, since much more torque is required uphill than downhill and to make it possible to climb some hills without changing gear.

The vehicle is provided with a positioning system and map information, and position data from the positioning system and topology data from the map information are used to construct a horizon which illustrates the nature of the itinerary. In the description of the present invention, GPS (Global Positioning System) is indicated for determining position data for the vehicle, but it should be appreciated that other kinds of global or regional positioning systems are also conceivable to provide the vehicle with position data, e.g. systems which use a radio receiver to determine the vehicle's position. The vehicle may also use sensors to scan the surroundings and thereby determine its position.

Figure 1:
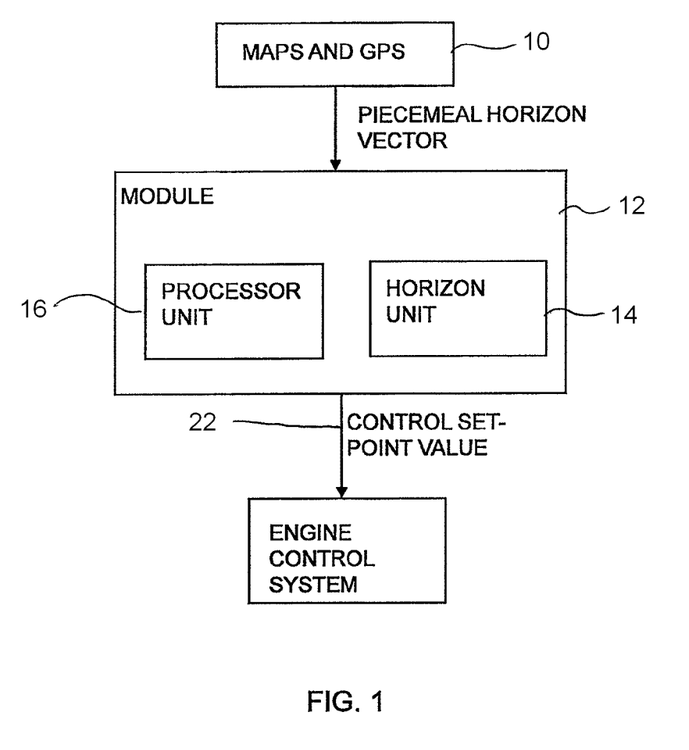
FIG. 1 depicts the functional context of the regulating module in the vehicle according to an embodiment of the invention.

FIG. 1 illustrates how a unit 10 incorporates map and GPS information about the itinerary. The itinerary is exemplified below as a single route for the vehicle but it should be appreciated that various conceivable itineraries are incorporated as information via maps and GPS or other positioning systems. The driver may also register the starting point and destination point of the intended journey, in which case the unit uses map data etc. to calculate a suitable route. The itinerary or, if there are two or more possible alternatives, the itineraries are sent bit by bit via CAN to a module 12 for regulation of set-point values, which module may be separate from or form part of the control system which is to use the set-point values to regulate the vehicle's speed. Alternatively, the unit with maps and a positioning system may also be part of a system which uses the set-point values for regulating. In the regulating module, the bits are put together in a horizon unit 14 to form a horizon and are processed by the processor unit 16 to create an internal horizon by which the control system can regulate. If there are two or more alternative itineraries, a number of internal horizons are created for the various alternatives. The horizon or horizons are then continually supplemented by new bits from the unit with GPS and map data to maintain a desired length of horizon. The horizon is thus updated continuously when the vehicle is in motion.

CAN (controller area network) is a serial bus system specially developed for use in vehicles. The CAN data bus makes digital data exchange possible between sensors, regulating components, actuators, control devices, etc. and ensures that two or more control devices can have access to the signals from a given sensor in order to use them to control components connected to them.

Figure 2:
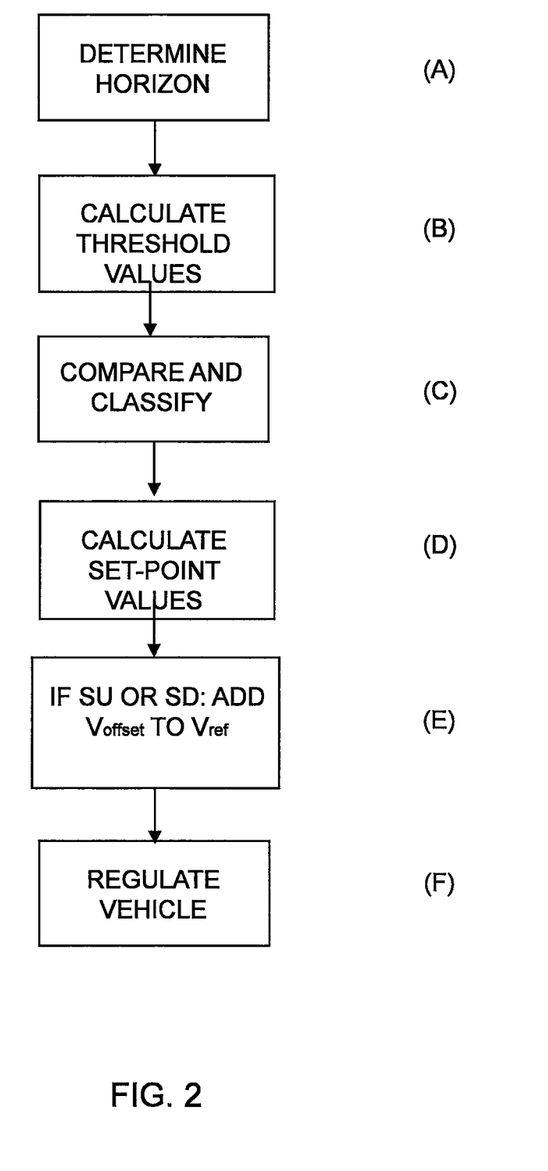
FIG. 2 depicts a flowchart for the method according to an embodiment of the invention.

FIG. 2 is a flowchart of the steps which the method according to an embodiment of the invention comprises. The example described below refers to only one horizon but it should be appreciated that two or more horizons for various alternative itineraries may be constructed in parallel. A first step A) determines a horizon based on position data and map data of an itinerary made up of route segments with length and gradient characteristics for each segment. When the vehicle is on the move, the horizon module puts the bits together to form a horizon of the itinerary, the length of the horizon being typically of the order of 1 to 2 km. The horizon unit keeps track of where the vehicle is and continually adds to the horizon so that the length of the horizon is kept constant. According to an embodiment, when the destination point of the journey is within the length of the horizon, the horizon is no longer added to, since travelling beyond the destination point is not relevant.

The horizon is made up of route segments which have characteristics in the form of their length and gradient associated with them. The horizon is here exemplified in matrix form in which each column contains a characteristic for a segment. A matrix covering 80 m forwards of an itinerary may take the following form:

$$\begin{bmatrix} dx, & \% \\ 20, & 0.2 \\ 20, & 0.1 \\ 20, & -0.1 \\ 20, & -0.3 \end{bmatrix},$$

where the first column is the length of each segment in metres (dx) and the second column the gradient in % of each segment. The matrix is to be taken to mean that for 20 metres forwards from the vehicle's current position the gradient is 0.2%, followed by 20 metres with a gradient of 0.1%, and so on. The values for segments and gradients need not be expressed in relative values but may instead be expressed in absolute values. The matrix is with advantage vector-formed but may instead be of pointer structure, in the form of data packages or the like. There are also various other conceivable characteristics for segments, e.g. radius of curvature, traffic signs, various hindrances etc.

Thereafter, the segments within the horizon are placed in various categories in a step B) in which threshold values are calculated for the gradient of segments according to one or more vehicle-specific values, which threshold values serve as boundaries for assigning segments to different categories. The threshold values for the gradient are calculated, according to an embodiment of the invention, by one or more vehicle-specific values, e.g. current transmission ratio, current vehicle weight, the engine's maximum torque curve, mechanical friction and/or the vehicle's running resistance at current speed. A vehicle model internal to the control system is used to estimate running resistance at current speed. Transmission ratio and maximum torque are known magnitudes in the vehicle's control system, and vehicle weight is estimated on-line.

The following are examples of five different categories in which segments may be placed:
Level road: Segment with gradient 0±a tolerance.
Steep upgrade: Segment with too steep a gradient for the vehicle to maintain speed in current gear.
Gentle upgrade: Segment with gradient between tolerance and threshold value for sharp upgrade.
Steep downgrade: Segment with such a steep downhill gradient that the vehicle is accelerated by the gradient.
Gentle downgrade: Segment with a downward gradient between the negative tolerance and the threshold value for sharp downgrade.

To place segments in the categories described above, threshold values are therefore calculated in the form of two gradient threshold values $l_{min}$ and $l_{max}$, where $l_{min}$ is the minimum gradient for the vehicle to be accelerated by the gradient downhill, and $l_{max}$ is the maximum gradient at which the vehicle can maintain speed without changing gear uphill. Thus the vehicle's speed can be regulated according to the gradient and length of the road ahead so that the vehicle can be driven in a fuel economising way by means of cruise control in undulating terrain. For example, the tolerance for the "level road" category is preferably between 0.05% and -0.05% when the vehicle travels at 80 km/h. On the basis of the same speed (80 km/h), $l_{min}$ is usually calculated to be of the order of -2 to -7%, and $l_{max}$ usually 1 to 6%. However, these values depend greatly on current transmission ratio (gear+fixed rear axle ratio), engine performance and total weight.

In a next step C) the method compares the gradient of each segment with the threshold values, and each segment within the horizon is placed in a category according to the results of the comparisons.

After each segment within the horizon has been placed in a category, an internal horizon for the control system can be constructed on the basis of the classification of segments and the horizon. Step D) calculates speed set-point values $v_{ref}$ for the vehicle's control system across the horizon according to rules pertaining to the categories in which segments within the horizon are placed. The internal horizon comprises entry speeds $v_i$ to each segment, which are speeds which the control system has to abide by. Each segment also has a final speed $v_{out}$ which is equal to the entry speed $v_i$ to the next segment. These entry speeds $v_i$ and final speeds $v_{out}$ are therefore speed set-point values $v_{ref}$ by which the vehicle's control system regulates.

According to an embodiment, a speed change requested is ramped between two entry speeds $v_i$ to provide the control system with set-point values $v_{ref}$ which bring about a gradual increase or decrease in the vehicle's speed. Ramping a speed change results in calculation of gradual speed changes which need to be made to achieve the speed change. In other words, a linear speed increase is achieved by ramping. All the segments within the horizon are stepped through continuously, and as new segments are added to the horizon the entry speeds $v_i$ are adjusted as necessary in segments, within the range of the vehicle's reference speed $v_{set}$. $v_{set}$ is the reference speed set by the driver and desired to be kept by the vehicle's control systems within a range when the vehicle is in motion. The range is bounded by two speeds $v_{min}$ and $v_{max}$ which may be set manually by the driver or be set automatically by calculations of a suitable range which is preferably calculated in the regulating module.

The various rules for the segment categories therefore regulate how the entry speed $v_i$ for each segment is to be adjusted. If a segment is placed in the "level road" category, no change will take place in the entry speed $v_i$ to the segment. Driving the vehicle such that comfort requirements are met involves using Torricelli's equation as below to calculate the constant acceleration or retardation which needs to be applied to the vehicle:

$$v_{out}^2 = v_i^2 + 2 \cdot a \cdot s \qquad (1)$$

where $v_i$ is the entry speed to the segment, $v_{out}$ the vehicle's speed at the end of the segment, a the constant acceleration/retardation and s the length of the segment.

If a segment is in the "steep upgrade" or "steep downgrade" category, the final speed $v_{out}$ for the segment is predicted by solving equation (2) below:

$$v_{out}^2 = (a \cdot v_i^2 + b) \cdot (e^{(2 \cdot a \cdot s/M)} - b)/a \qquad (2)$$

where $$a = -C_d \cdot \rho \cdot A/2 \qquad (3)$$

$$b = F_{track} - F_{roll} - F_\alpha \qquad (4)$$

$$F_{track} = (T_{eng} \cdot i_{final} \cdot i_{gear} \cdot \mu_{gear})/r_{wheel} \qquad (5)$$

$$F_{roll} = \text{flatCorr} \cdot M \cdot g/1000 \cdot (C_{rrisoF} + C_b \cdot (v_i - v_{iso}) + C_{aF} \cdot (v_i^2 - v_{iso}^2)) \qquad (6)$$

$$F_\alpha = M \cdot g \cdot \sin(\arc \tan(\alpha)) \qquad (7)$$

$$\text{flatCorr} = 1/\sqrt{(1 - r_{wheel}/2.70)} \qquad (8)$$

The vehicle's final speed $v_{out}$ after the end of the segment is thus calculated according to this embodiment on the basis of the entry speed $v_i$ to the segment, the force $F_{track}$ acting from the engine torque in the vehicle's direction of movement, the force $F_{roll}$ from the rolling resistance acting upon the vehicle's wheels, and the force $F_\alpha$ acting upon the vehicle because of the gradient $\alpha$ of the segment. In addition, $C_d$ is the air resistance coefficient, $\rho$ the density of the air, A the largest cross-sectional area of the vehicle, $T_{eng}$ the engine torque, $i_{final}$ the vehicle's final gear, $i_{gear}$ the current transmission ratio in the gearbox, $\mu_{gear}$ the efficiency of the gear system, $r_{wheel}$ the vehicle's wheel radius, M the vehicle's weight, $C_{aF}$ and $C_b$ speed-dependent coefficients related to the rolling resistance of the wheels, $C_{rrisoF}$ a constant term related to the rolling resistance of the wheels and $V_{iso}$ an ISO speed, e.g. 80 km/h.

On segments in the "steep upgrade" category, the final speed $v_{out}$ is thereafter compared with $v_{min}$, and if $v_{out} < v_{min}$, then $v_i$ has to be increased so that $$v_i = \min(v_{max}, v_i + (v_{min} - v_{out})) \qquad (9)$$

otherwise no change in $v_i$ takes place, since $v_{out}$ meets the requirement of being within the range for the reference speed.

On segments in the "steep downgrade" category, the final speed $v_{out}$ is compared with $v_{max}$, and if $v_{out} > v_{max}$, then $v_i$ has to be decreased so that $$v_i = \max(v_{min}, v_i - (v_{out} - v_{max})) \qquad (10)$$

otherwise no change in $v_i$ takes place, since $v_{out}$ meets the requirement of being within the range for the reference speed.

On segments in the "gentle upgrade" category, the set-point value $v_{ref}$ is allowed to vary between $v_{min}$ and $v_{set}$ when a new segment is incorporated, i.e. $V_{min} \leq v_{ref} \leq v_{set}$. If $v_{ref} \geq v_{min}$, no acceleration of the vehicle is effected. If however $v_{ref} < v_{min}$, then $v_{ref}$ is applied to $v_{min}$ during the segment, or if $v_{ref} > v_{set}$, then $v_{ref}$ is ramped towards $v_{set}$ by means of equation (1). On segments in the "gentle downgrade" category, $v_{ref}$ is allowed to vary between $v_{set}$ and $v_{max}$ when a new segment is incorporated, i.e. $v_{set} \leq v_{ref} \leq v_{max}$, and if $v_{ref} \leq v_{max}$ no retardation of the vehicle is effected. If however $v_{ref} > v_{max}$ then $v_{ref}$ is applied to $v_{max}$ during the segment, or if $v_{ref} < v_{set}$, then $v_{ref}$ is ramped towards $v_{set}$ by means of equation (1). The five segment categories above may be simplified to three by deleting "gentle upgrade" and "gentle downgrade". The "level road" category will then cover a larger range bounded by the calculated threshold values $l_{min}$ and $l_{max}$, so the gradient on the segment has to be greater than $l_{min}$ if the gradient is negative or smaller than $l_{max}$ if the gradient is positive.

When a segment which comes after a segment within the horizon which is in the "gentle upgrade" or "gentle downgrade" category causes a change in the entry speeds to segments in those categories, it may mean that entry speeds and hence the set-point speeds for the control system are corrected and become higher or lower than as indicated by the above rules for the "gentle upgrade or gentle downgrade" categories. This therefore applies when the entry speeds to segments are corrected according to subsequent segments.

Continuous stepping through all the segments within the horizon makes it possible to determine an internal horizon which presents predicted entry speed values $v_i$ to each segment. Continuous stepping through segments within the horizon involves continuously calculating the entry values $v_i$ to each segment, so calculating an entry value $v_i$ may entail having to change entry values both forwards and backwards in the internal horizon. Where for example a predicted speed in a segment is outside a set range, it is desirable to correct the speed in preceding segments.

Figure 3:
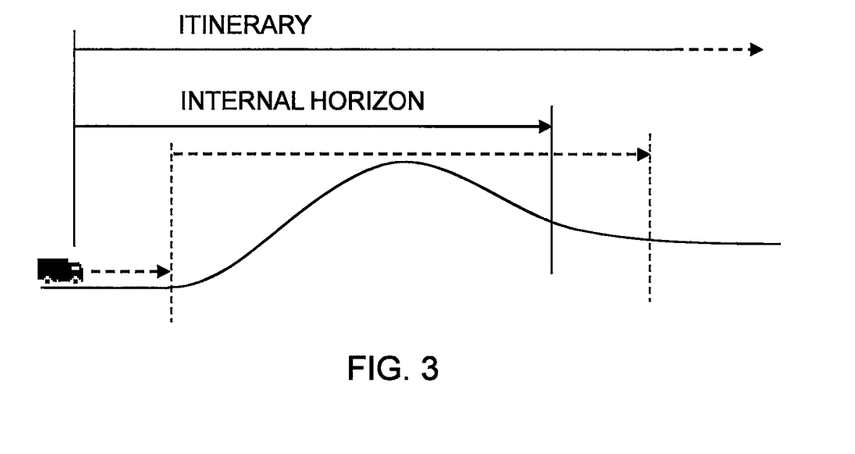
FIG. 3 illustrates the length of a control system's horizon in relation to the length of the itinerary for the vehicle.
Figure 4:
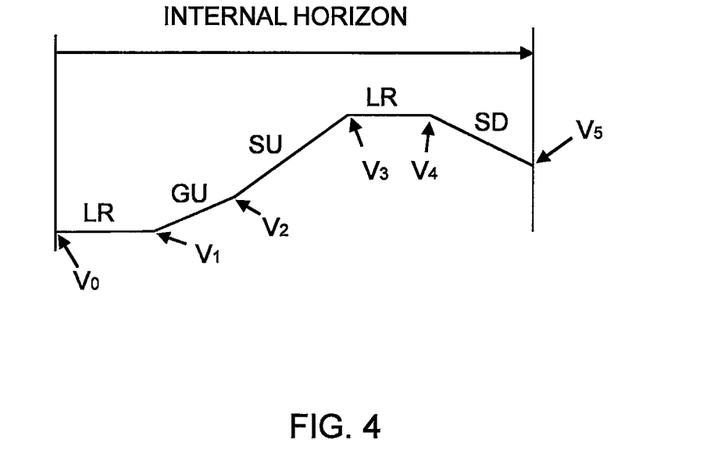
FIG. 4 illustrates the various speeds predicted and the categories of segments which are continuously updated as new segments are added to the horizon.

FIG. 3 depicts the internal horizon relative to the itinerary. The internal horizon moves continually forwards as indicated by the broken inner horizon moved forward. FIG. 4 depicts an example of an internal horizon in which the various segments are placed in a category. In the diagram "LR" stands for "level road", "GU" for "gentle upgrade", "SU" for "steep upgrade" and "SD" for "steep downgrade". The speed is initially $v_0$, and if this is not $v_{set}$, the set-point values are ramped from $v_0$ to $v_{set}$ with comfort acceptance according to Torricelli's equation (1) because the category is "level road". The next segment is a "gentle upgrade" and no change of $v_{ref}$ takes place so long as $v_{min} \leq v_{ref} \leq v_{set}$, since no acceleration need be applied in this segment. The next segment is a "steep upgrade", so the final speed $v_3$ for it is predicted by means of formula (2), so $v_2$ has to be increased if $v_3 < v_{min}$ according to formula (9). The next segment is "level road", so $v_{ref}$ is changed towards $v_{set}$ with limitation of the comfort requirement from Torricelli's equation (1). Thereafter comes a segment which is a "steep downgrade", so the final speed $v_5$ is predicted by means of formula (2) and $v_4$ has to be decreased if $v_5 > v_{max}$ according to formula (10). As soon as a speed backwards in the internal horizon is changed, the remaining speeds backwards in the internal horizon are adjusted to be able to fulfil the speed further forwards. At each speed change which has to be effected, the method according to the invention calculates by means of Torricelli's equation (1) whether it is possible to achieve the speed change with comfort requirement. If not, the entry speed to the segment is adjusted so that comfort requirement can be maintained.

The internal horizon is therefore predicted according to the aforesaid rules associated with segment classification. The vehicle travels progressively along the route and the control system is supplied with speed set-point values by which it controls the vehicle's speed. When the vehicle is in a segment which is in a category indicating a steep upgrade or a steep downgrade, a step E) adds an offset $v_{offset}$ to the calculated speed set-point values $v_{ref}$. The vehicle is regulated according to the speed set-point values $v_{ref}$ with an offset $v_{offset}$ (step F) until the end of the steep upgrade or steep downgrade. Thereafter speed set-point values $v_{ref}$ are again taken from the predicted internal horizon. It is thus possible to compensate for the cruise control logic being in some other control system than the EMS, by quickly acquiring a large regulating error from the beginning of an upgrade or a small regulating error on a downgrade. A typical value for $v_{offset}$ is 5 km/h, but other values are also conceivable. Maximum engine torque is then available on steep upgrades and there is also assurance that the vehicle need be braked as little as possible downhill.

According to an embodiment, a positive offset is thus added to the calculated speed set-point values $v_{ref}$ when the vehicle is on a steep upgrade. Speed set-point values for the vehicle's control system are then applied to the $v_{ref}$ plus $v_{offset}$ calculated by the control system when the vehicle is on a steep upgrade. The segment or segments are then of the "steep upgrade". A maximum of available engine torque is thus assured when embarking upon steep upgrades.

Similarly, when the vehicle is on a steep downgrade, a negative offset $v_{offset}$ is added to the calculated speed set-point values $v_{ref}$. Speed set-point values for the vehicle's control system are then applied to the $v_{ref}$ plus $-|v_{offset}|$ calculated by the control system when the vehicle is on a steep downgrade. The segment or segments are then of the "steep downgrade"

type. A drag torque or zero torque is thus guaranteed when embarking upon steep downgrades, to avoid needing to brake downhill.

According to an embodiment, said offset $v_{offset}$ is a variable value over time, in order to achieve appropriate performance and comfort criteria. For example, to prevent jerking due to rapid set-point value changes, the offset $v_{offset}$ is reduced towards zero at the end of a steep upgrade. Similarly, $v_{offset}$ is reduced towards zero at the end of a steep downgrade.

Figure 5:
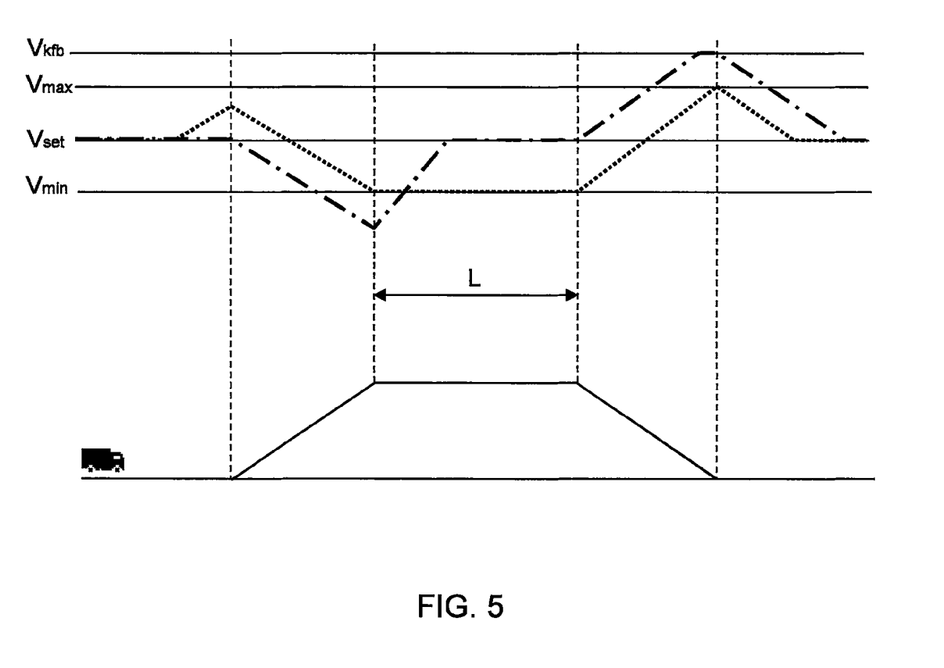
FIG. 5 illustrates the difference between the invention and a traditional cruise control according to an embodiment of the invention.
Figure 6:
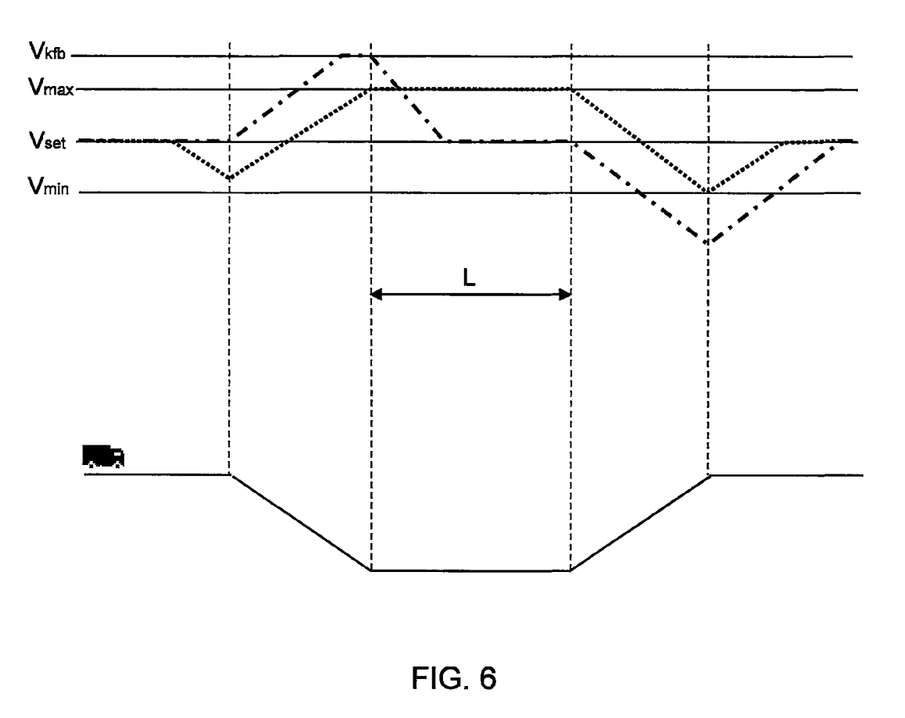
FIG. 6 illustrates the difference between the invention and a traditional cruise control according to an embodiment of the invention.

To avoid consuming unnecessarily large amounts of fuel when a first steep upgrade or a first steep downgrade is followed by a steep upgrade or a steep downgrade within a certain distance L, an embodiment does not allow both acceleration and retardation of the vehicle within the section L. Only acceleration or retardation to a desired speed $v_{ref}$ is effected before the next hill. This embodiment is illustrated in FIG. 5 and FIG. 6. A conventional cruise control is represented by the chain-dotted line and a cruise control according to this embodiment by the dotted line. Section L is here calculated to cover a certain distance which is less than a predetermined threshold value. The threshold value according to an embodiment is 250-500 m. L may for example be calculated by adding together the lengths of segments situated between the hills. When the vehicle has climbed the hill in FIG. 5, $v_{ref}$ is set as its desired speed before the next hill, in this case $v_{min}$. This speed is thereafter maintained throughout section L, i.e. until the vehicle is on, for example, a steep downgrade. Any need for the vehicle to raise speed is thus avoided, since it will endeavour to maintain the speed $v_{set}$, in order to lower the speed later and thereby take advantage of the energy available downhill, i.e. by avoiding having to brake the vehicle. When the vehicle is driven with conventional cruise control, more energy will therefore need to be braked away downhill, as illustrated in the diagram. $v_{kfb}$ represents here the retarder service brake setting (constant speed brake setting), i.e. the vehicle's auxiliary brake cruise control which acts when the vehicle is braked downhill.

The vehicle is braked to avoid going above this speed setting. Correspondingly, energy is saved by maintaining a constant speed during section L, as illustrated in FIG. 6. When the vehicle has travelled down the hill in FIG. 6, $v_{ref}$ is set as its desired speed before the next hill, in this case $v_{max}$. This speed is thereafter maintained throughout section L, i.e. until the vehicle is on, for example, a steep climb. Any need for the vehicle to raise speed is thus avoided, since the vehicle will endeavour to maintain the speed $v_{set}$.

The present invention relates also to a module 12 for determining speed set-point values for a vehicle's control systems, as illustrated in FIG. 1. The module comprises a horizon unit 14 configured to determining a horizon by means of position data and map data of an itinerary made up of route segments with length and gradient characteristics for each segment. The module further comprises a processor unit 16 configured to performing steps B) to E) as described above, after which the vehicle is regulated according to the speed set-point values $v_{ref}$ at 22. The result is a module which can be used in a vehicle to regulate speed set-point values in a reliable way in cases where the module is in an ECU other than the vehicle's ECU, i.e. its EMS. The module may be part of a control system for which it is intended to regulate set-point values, or be a freestanding module separate from the control system.

According to an embodiment, when the vehicle is on a steep upgrade, the processor unit is adapted to adding a positive offset to the calculated speed set-point values $v_{ref}$. The speed set-point values for the vehicle's control systems are then added to the $v_{ref}$ plus $v_{offset}$ calculated by the control system when the vehicle is on a steep upgrade. A maximum of available engine torque is thus assured when embarking upon steep upgrades.

According to a further embodiment, when the vehicle is on a steep downgrade, the processor unit is adapted to adding a negative offset $v_{offset}$ to the calculated speed set-point values $v_{ref}$. The speed set-point values for the vehicle's control systems are then added to the $v_{ref}$ plus $-|v_{offset}|$ calculated by the control system when the vehicle is on a steep downgrade. A drag torque or zero torque is thus assured when embarking upon steep downgrades.

According to an embodiment illustrated in FIGS. 5 and 6, when a first steep upgrade or a first steep downgrade is followed by a steep upgrade or a steep downgrade within a certain distance L, the processor unit is configured to not allowing both acceleration and retardation of the vehicle within the section L. Either acceleration or retardation to a desired speed $v_{ref}$ is applied before the next hill. Fuel can be saved by thus avoiding an increase in the vehicle's speed that would thereafter have to be lowered or a decrease in speed that would thereafter have to be increased.

The vehicle-specific values of current transmission ratio, current vehicle weight, the engine's maximum torque curve, mechanical friction and/or the vehicle's running resistance at current speed are preferably determined in the processor unit. The threshold values may therefore be determined on the basis of the vehicle's state at the time. Signals needed for determining these values may be taken from CAN or be detected by suitable sensors.

According to an embodiment, the characteristics of segments are their length and gradient and the processor unit is adapted to calculating the threshold values in the form of gradient threshold values $l_{min}$ and $l_{max}$. Thus the vehicle's speed can be regulated according to the undulation of the itinerary in order to travel in a fuel economising way.

According to another embodiment, the horizon unit is adapted to determining the horizon by using position data from a GPS system. The vehicle's geographical position can thus be determined continuously.

The horizon unit is preferably adapted to determining the horizon continuously so long as the horizon does not exceed a planned itinerary for the vehicle, and the processor unit is adapted to continuously performing steps for calculating and updating the set-point values for the control system for the whole length of the internal horizon. In an embodiment, the horizon is thus constructed piecemeal progressively as the vehicle travels along the itinerary. The set-point values for the control system are calculated and updated continuously irrespective of whether new segments are added or not, since the set-point values to be calculated depend also on how the vehicle-specific values of the vehicle change along the itinerary.

The present invention comprises also a computer program product comprising computer program instructions for enabling a computer system in a vehicle to perform the steps according to the method when the computer program instructions are run on said computer system. The computer program instructions are preferably stored on a medium which is readable by a computer system, e.g. a CD ROM, USB memory, or they may be transmitted wirelessly or by line to the computer system.

The present invention is not limited to the embodiments described above. Various alternatives, modifications and equivalents may be used. The aforesaid embodiments therefore do not limit the scope of the invention which is defined by the attached claims.

The invention claimed is:

1. A method for determination of speed set-point values $v_{ref}$ for a vehicle's control systems, the method comprising:
    A) determining a horizon using position data and map data of an itinerary made up of route segments with length and gradient characteristics for each segment;
    B) calculating threshold values for the gradient of segments according to one or more vehicle-specific values, which threshold values serve as boundaries for assigning segments to various categories;
    C) comparing the gradient of each segment with the threshold values and placing each segment within the horizon in a category according to the results of the comparisons;
    D) calculating speed set-point values $v_{ref}$ for the vehicle's control systems across the horizon according to rules pertaining to the categories in which segments within the horizon are placed;
    E) adding an offset $v_{offset}$ to the calculated speed set-point values $v_{ref}$ when the vehicle is in a segment which is in a category indicating a steep upgrade or a steep downgrade; and
    F) regulating the vehicle according to the speed set-point values $v_{ref}$.

2. A method according to claim 1, in which a positive offset $v_{offset}$ is added to the calculated speed set-point values $v_{ref}$ when the vehicle is on a steep upgrade.

3. A method according to claim 1, in which a negative offset $v_{offset}$ is added to the calculated speed set-point values $v_{ref}$ when the vehicle is on a steep downgrade.

4. A method according to claim 1, wherein said offset $v_{offset}$ is a variable value over time.

5. A method according to claim 1, further comprising when a first steep upgrade or a first steep downgrade is followed by a steep upgrade or a steep downgrade within a certain distance L, not allowing both acceleration and retardation of the vehicle within the section L.

6. A method according to claim 1, wherein vehicle-specific values are determined by current transmission ratio, current vehicle weight, the engine's maximum torque curve, mechanical friction and/or the vehicle's running resistance at a current speed.

7. A method according to claim 1, wherein threshold values are calculated in the form of gradient threshold values $l_{min}$ and $l_{max}$.

8. A method according to claim 1, wherein the horizon is determined by using position data from a GPS.

9. A module for determining speed set-point values for a vehicle's control systems, the module comprising:
    a horizon unit configured and operable to determine a horizon using position data and map data of an itinerary made up of route segments with length and gradient characteristics for each segment;
    a processor unit configured and operable to: calculate threshold values for the gradient of segments according to one or more vehicle-specific values, which threshold values serve as boundaries for assigning segments to various categories; compare the gradient of each segment with the threshold values and placing each segment within the horizon in a category according to the results of the comparisons; calculate speed set-point values $v_{ref}$ for the vehicle's control systems across the horizon according to rules pertaining to the categories in which segments within the horizon are placed; and configured and operable to add an offset $v_{offset}$ to the calculated speed set-point values $v_{ref}$ when the vehicle is in a segment which is in a category indicating a steep upgrade or a steep downgrade, after which the vehicle is regulated according to the speed set-point values $v_{ref}$.

10. A module according to claim 9, in which the processor unit is configured and operable to add a positive offset $v_{offset}$ to the calculated speed set-point values $v_{ref}$ when the vehicle is on a steep upgrade.

11. A module according to claim 9, wherein the processor unit is configured and operable to add a negative offset $v_{offset}$ to the calculated speed set-point values $v_{ref}$ when the vehicle is on a steep downgrade.

12. A module according to claim 9, wherein said offset $v_{offset}$ is a variable value over time.

13. A module according to claim 9, wherein when a first steep upgrade or a first steep downgrade is followed by a steep upgrade or a steep downgrade within a certain distance L, the processor unit is configured and operable to not allow both acceleration and retardation of the vehicle within the section L.

14. A module according to claim 9, wherein vehicle-specific values are determined by current transmission ratio, current vehicle weight, the engine's maximum torque curve, mechanical friction and/or the vehicle's running resistance at a current speed.

15. A module according to claim 9, wherein the processor unit is configured and operable to calculate threshold values in the form of gradient threshold values $l_{min}$ and $l_{max}$.

16. A module according to claim 9, wherein the horizon unit is configured and operable to determine the horizon by using position data from a GPS.

17. A computer program product comprising computer program instructions for enabling a computer system in a vehicle to perform a method for determination of speed set-point values $v_{ref}$ for a vehicle's control systems, the method comprising:
    A) determining a horizon using position data and map data of an itinerary made up of route segments with length and gradient characteristics for each segment;
    B) calculating threshold values for the gradient of segments according to one or more vehicle-specific values, which threshold values serve as boundaries for assigning segments to various categories;
    C) comparing the gradient of each segment with the threshold values and placing each segment within the horizon in a category according to the results of the comparisons;
    D) calculating speed set-point values $v_{ref}$ for the vehicle's control systems across the horizon according to rules pertaining to the categories in which segments within the horizon are placed;
    E) adding an offset $v_{offset}$ to the calculated speed set-point values $v_{ref}$ when the vehicle is in a segment which is in a category indicating a steep upgrade or a steep downgrade; and
    F) regulating the vehicle according to the speed set-point values $v_{ref}$,
    wherein the computer program instructions are stored on a non-transitory medium which is readable by a computer system.

* * * * *